INVENTORS
GEORGE E. COEYTAUX
MARCEL J. DERAMOND
EDGAR A. HUGUES

BY *A. A. Saffitz*

ATTORNEY

Dec. 20, 1960     G. E. COEYTAUX ET AL     2,964,991
OPTICAL INSTRUMENT FOR AIMING DIRECT-FIRING FIREARMS
Filed Sept. 29, 1959     7 Sheets-Sheet 2

INVENTORS
GEORGE E. COEYTAUX
MARCEL J. DERAMOND
EDGAR A. HUGUES

BY

ATTORNEY

Dec. 20, 1960 G. E. COEYTAUX ET AL 2,964,991
OPTICAL INSTRUMENT FOR AIMING DIRECT-FIRING FIREARMS
Filed Sept. 29, 1959 7 Sheets-Sheet 3
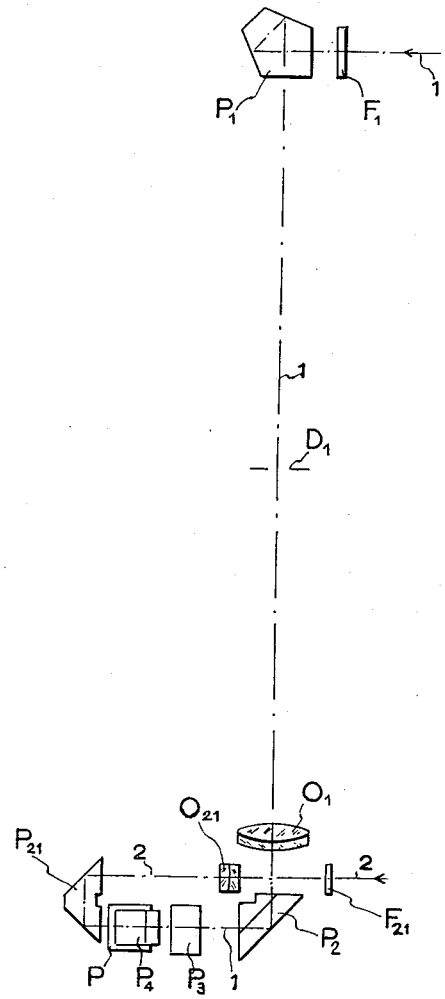
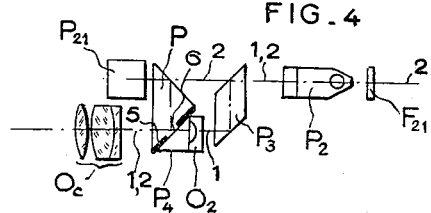
INVENTORS
GEORGE E. COEYTAUX
MARCEL J. DERAMOND
EDGAR A. HUGUES
ATTORNEY

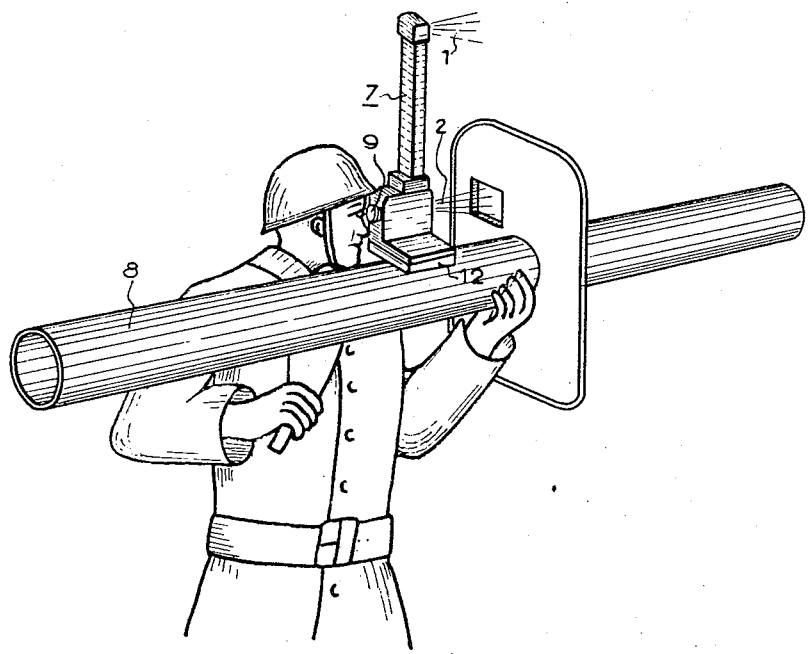

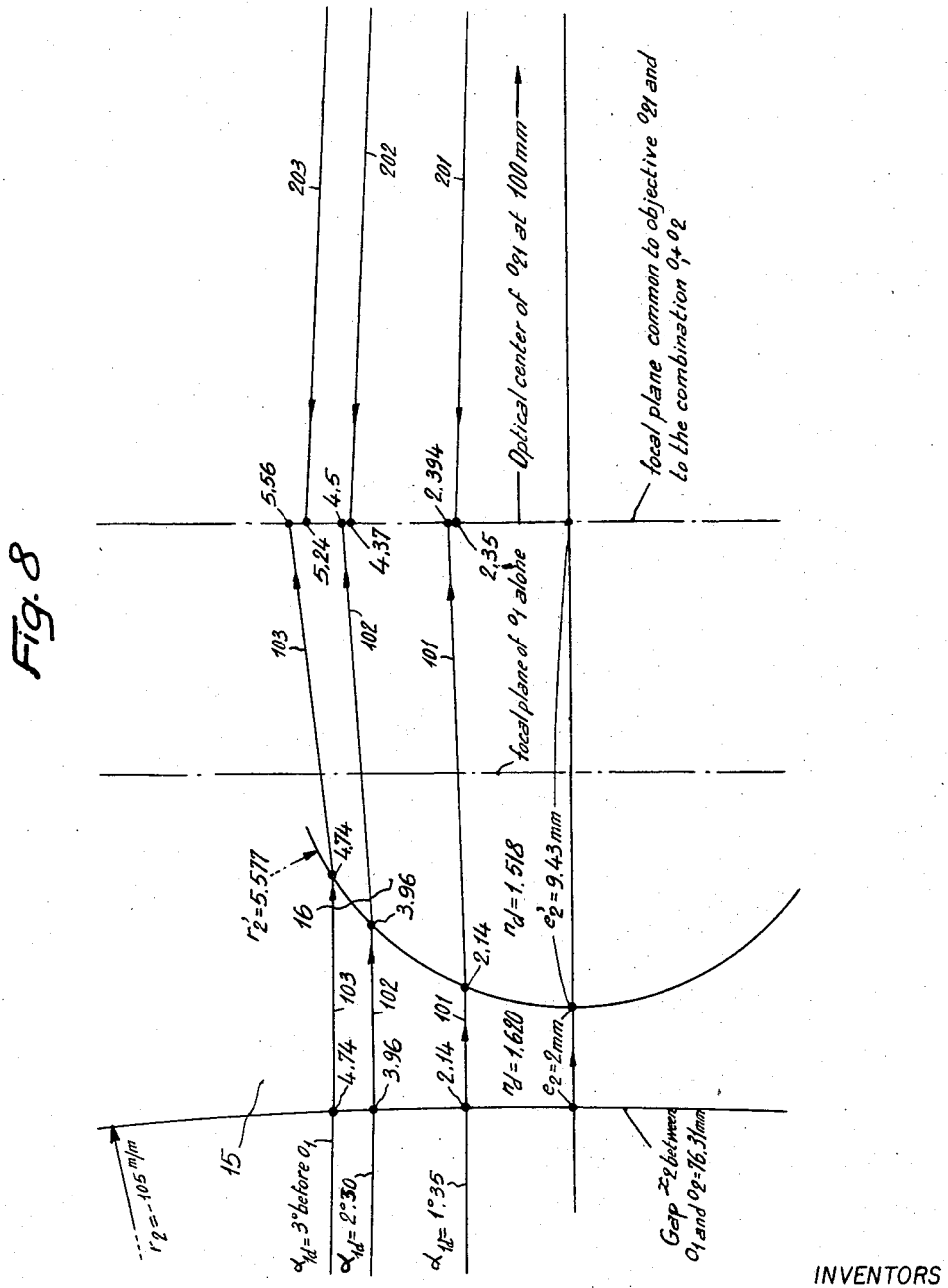

Dec. 20, 1960   G. E. COEYTAUX ET AL   2,964,991
OPTICAL INSTRUMENT FOR AIMING DIRECT-FIRING FIREARMS
Filed Sept. 29, 1959   7 Sheets-Sheet 6

INVENTORS
GEORGE E. COEYTAUX
MARCEL J. DERAMOND
EDGAR A. HUGUES

ATTORNEY

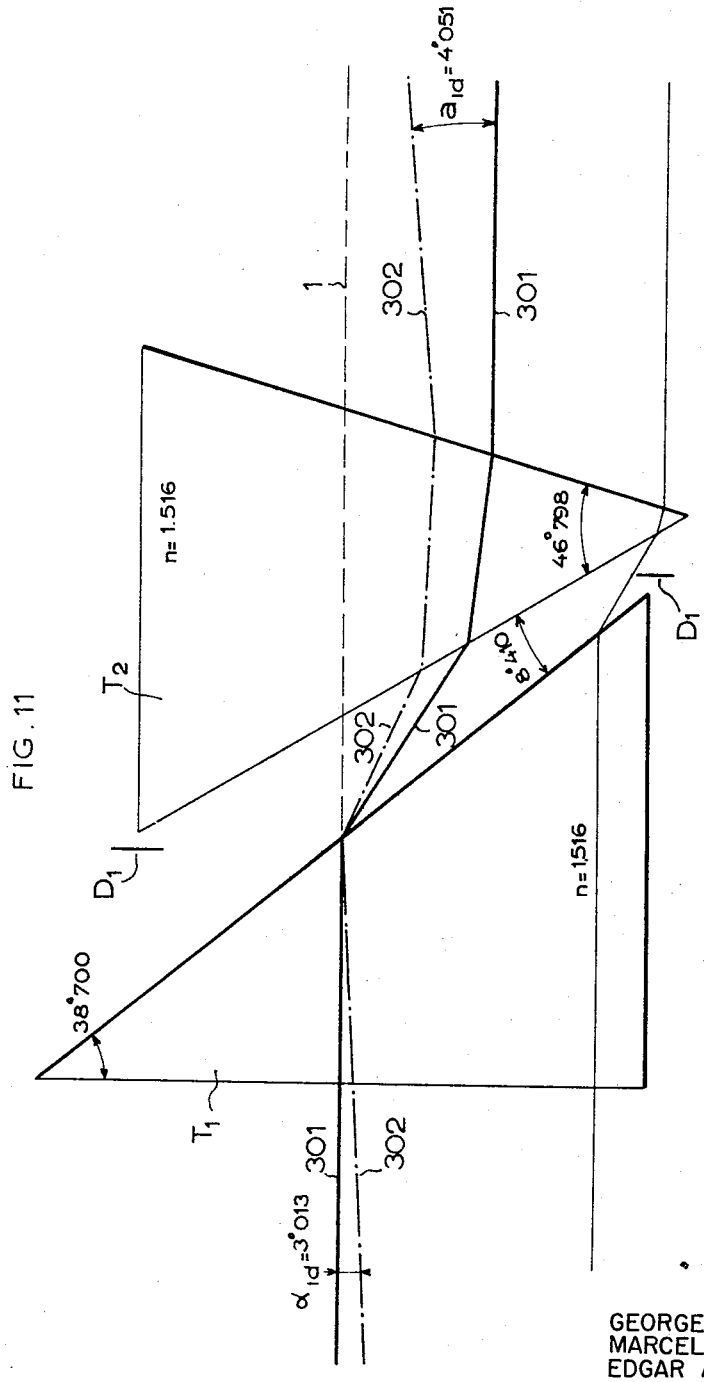

United States Patent Office 2,964,991
Patented Dec. 20, 1960

2,964,991
OPTICAL INSTRUMENT FOR AIMING DIRECT-FIRING FIREARMS

Georges E. Coeytaux, 25 bis Rue du Chateau, Neuilly-sur-Seine, France, and Marcel J. Deramond, 6 Rue le Dantec, and Edgar A. Hugues, 64 Rue Mademoiselle, both of Paris, France
Filed Sept. 29, 1959, Ser. No. 843,164
5 Claims. (Cl. 88—2.6)

The present application is a continuation-in-part of our copending application Ser. No. 555,973 filed December 24, 1955, now abandoned.

The present invention concerns the combination of a direct-firing weapon or firearm with an optical instrument which is intended for ensuring superelevation and elevation aiming of said weapon, whether the weapons concerned be firearms that are aimed with shouldering (e.g. rifles and rocket-launchers) or firearms that are aimed on gun-carriages with aiming handwheels (e.g. recoilless guns, rocket-launching ramps or tubes, and recoiling guns).

In the present specification, the words "direct firing firearms" mean flat trajectory firearms, i.e. firearms propelling a missile of relatively high velocity whose trajectory is substantially undeformable with respect to the elevation of the target. In this type of firearm, the superelevation is substantially independent of the elevation of the target, in all the range of elevations useable with the firearm, and depends only on the distance of the weapon to the target.

The instrument of the invention comprises an optical system arranged in accordance with the already known structure of a separate-field coincidence range-finder comprising two objectives having unequal focal lengths and means for juxtaposing the fields of the two objectives on one side and the other of a separating line. In the ordinary use of a coincidence range-finder for range-finding measurements, the range-finder is tilted about its axis of rotation until coincidence of the two images of the target, which are produced by the objectives, is obtained at a point of the field on one side and the other of the separating line, and the angle of tilt measures the distance. In the range-finders of the prior art the angle of tilt in relation to increasing range is as known a hyperbolic function.

The object of the invention is to vary the hyperbolic function interrelating the tilt and the distance in a conventional coincidence range-finder to render it a parabola in nature which may be made identical with the theoretical parabolic ballistic superelevation curve for a specific gun using projectiles of a specific charge so that the range-finder of the invention may be rigidly connected to the specific gun with no moving parts throughout the system. Consequently, the instrument of the invention serves, at the same time, as a sighting telescope and as an instrument for measuring distance.

A further object of the invention is to construct a range-finder that is rigidly secured to the barrel of a firearm and placed in the vertical plane passing along the axis of said barrel, and in said plane, perpendicularly or very nearly perpendicularly to said axis, such that the angle of tilt, given to the firearm and, consequently, to the range-finder, for measuring the distance of the target by producing coincidence of the two images produced by the two objectives of the range-finder along the separating line, is exactly equal to the superelevation corresponding to this distance, so that, when the person taking aim has produced coincidence of the two images of the target, the angle thus given to the firearm is not only the angle which measures the distance but is also equal to the superelevation corresponding to this distance for the specific firearm used. This will mean that, in a range-finder according to the invention, the condition of "superelevation-distance coupling" has been obtained.

According to the invention, it is possible to succeed in equalizing the angles of rotation about the trunnion of the firearm or about the shoulder of the person aiming, in superelevation and in range-finding, by giving a suitably calculated distortion to one of the focal lengths of the objectives of the coincidence range-finder, the other focal length being free from distortion, or by giving suitable distortions to each of the focal lengths.

The invention will be better understood on reading the detailed description which will now be given and on examining the accompanying drawings, of which Figs. 1a and 1b are geometric diagrams which explain the operation of a coincidence range-finder of the present invention and the condition of superelevation-distance coupling;

Figs. 3 and 4 are optical diagrams showing, in vertical and horizontal projection respectively, a first type of range-finder according to the invention;

Fig. 7 represents the aiming instrument according to the invention mounted on a rocket launcher;

Fig. 8 shows the path of several light rays having determined incidence angles through the distorting doublet which is a part of one of the objectives of the instrument of the first type;

Fig. 11 shows the path of several light rays having determined incidence angles through the distorting prism system which is located behind one of the objectives of the instrument of the second type.

Figure 1A:
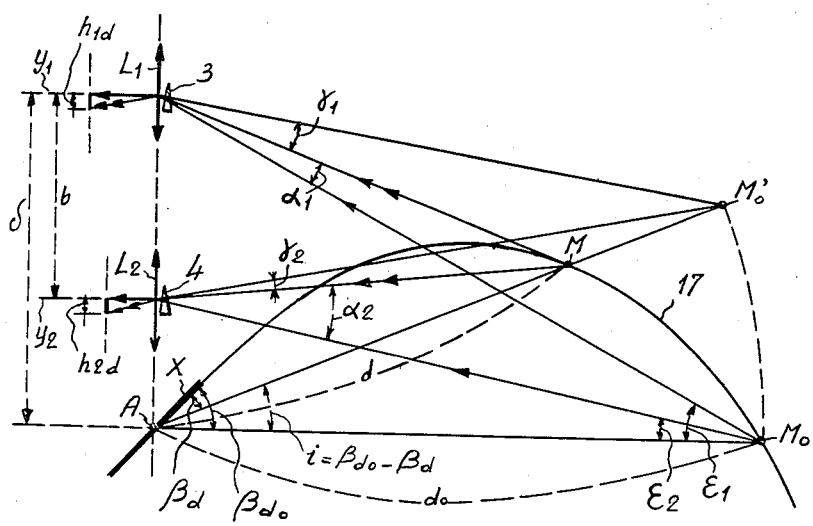
Figure 1B:
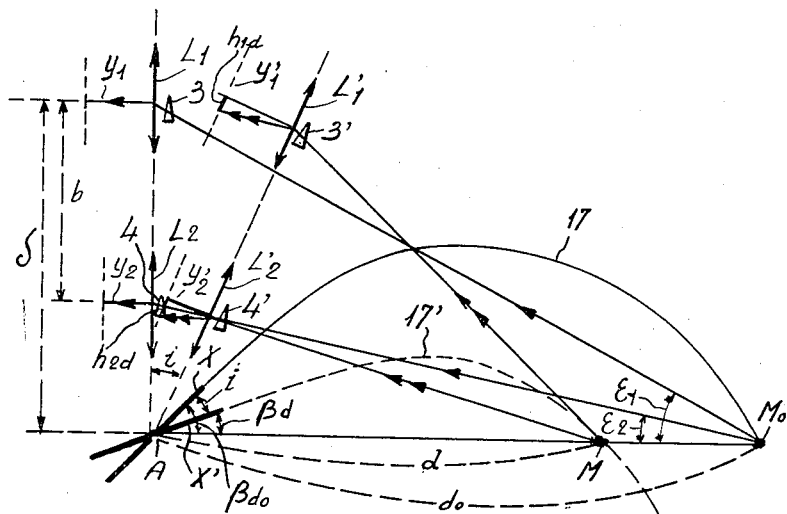

Referring first of all to Figs. 1a and 1b, let in a vertical plane $L_1$ and $L_2$ be the two objectives, X be the firearm with which the range-finder is associated, A be the axis of rotation of the barrel of the firearm, AX being the direction of the barrel. The range-finder is defined by the focal lengths $f_{1d}$ and $f_{2d}$ of the objectives, the distance $b$ between the centers of the objectives and the distance $\delta$ between the axis of the barrel of the firearm and the objective which is the more remote from the firearm. It is to be noticed even now that the quantity $(\delta-b)$ is small and can be neglected. Neglecting the quantity $(\delta-b)$ is all the same as assuming that the trajectory of the missile starts from the optical center of the objective which is the nearer of the firearm. Let $M_0$ be a target situated in the horizontal plane of the firearm at the distance $d_0$ which is chosen so that there will be coincidence of the images of said target at the common center of the two fields of the two objectives, that is to say so that the two images of $M_0$ as seen through $L_1$ and $L_2$ are both on the optical axes $y_1$ and $y_2$ of the objectives. In order to ensure this coincidence, it is sufficient to place, in front of $L_1$ and $L_2$ respectively, prisms 3 and 4 giving deviations:

$$\epsilon_1 = \frac{\delta}{d_0}$$

$$\epsilon_2 = \frac{\delta-b}{d_0}$$

Thus prisms 3 and 4 serve to adjust the zero of the range-finder, i.e. to determine the distance of the target the two images of which coincide at the center of the ocular field. As will be seen hereinafter, these prisms may be dispensed with and replaced by a convenient inclination of the base of the range-finder with respect to the barrel of the firearm.

Let us assume that it is now desired to establish coincidence of the images at another point of the field for a target M still in the horizontal plane of the firearm at the distance $d$. Then the unit consisting of the range-finder and the firearm must be tilted through a certain angle $i$ to restore this coincidence. In Fig. 1b, the new position of the range-finder derived from the starting vertical position is represented with primed reference numerals. The new position of the firearm becomes X′ instead of X and the ballistic superelevation curve of the firearm becomes 17′ instead of 17 (it is to be noted that in Figs. 1a and 1b the curvatures of curves 17 and 17′ has been emphasized). In order to simplify the drawings, it has been assumed in Fig. 1a that the firearm and the range-finder have remained in the same position and that the target M has been displaced through an angle $i$. But it must be well understood that the representation of Fig. 1a does not involve any change of elevation of target M which remains in the horizontal plane of the firearm. Let us place, on the right-hand side of the line AM, a point M′₀ at the distance $d_0$ from A and let us denote the following angles by $\alpha_1$, $\alpha_2$, $\gamma_1$ and $\gamma_2$:

$$\alpha_1 = \widehat{ML_1M_0}$$
$$\alpha_2 = \widehat{ML_2M_0}$$
$$\gamma_1 = \widehat{ML_1M_0'}$$
$$\gamma_2 = \widehat{ML_2M_0'}$$

It is seen in Fig. 1a that:

$$\alpha_1 = i - \gamma_1$$
$$\gamma_1 = \widehat{L_1MA} - \widehat{L_1M_0'A} = \frac{\delta}{d} - \frac{\delta}{d_0}$$
$$\alpha_2 = i - \gamma$$
$$\gamma_2 = \widehat{L_2MA} - \widehat{L_2M_0'A} = \frac{\delta-b}{d} - \frac{\delta-b}{d_0}$$

from which:

$$\alpha_1 = i - \delta\left(\frac{1}{d} - \frac{1}{d_0}\right) \quad (1)$$

$$\alpha_2 = i - (\delta-b)\left(\frac{1}{d} - \frac{1}{d_0}\right) \quad (2)$$

The relationship which expresses coincidence in the common field of the two images is:

$$h_{1d} = h_{2d} = h_d = \alpha_1 f_{1d} = \alpha_2 f_{2d} \quad (3)$$

in which $h_{1d}$ and $h_{2d}$ are respectively the distances of the images of the target to the center of the field of each objective and $h_d$ the distance of the two images of the target at coincidence to the center of the field of the range-finder.

From the relationships (1), (2) and (3), we obtain:

$$\frac{f_{1d}}{f_{2d}} = \frac{i - (\delta-b)\left(\frac{1}{d} - \frac{1}{d_0}\right)}{i - \delta\left(\frac{1}{d} - \frac{1}{d_0}\right)} \quad (4)$$

$$i = \frac{[\delta f_{1d} - (\delta-b)f_{2d}]\left(\frac{1}{d} - \frac{1}{d_0}\right)}{f_{1d} - f_{2d}} \quad (5)$$

By replacing this value of $i$ in Equations 1 and 2, there is obtained:

$$\alpha_{1d} = \frac{bf_d}{f_{1d} - f_{2d}}\left[\frac{1}{d} - \frac{1}{d_0}\right] \quad (6)$$

$$\alpha_{2d} = \frac{bf_d}{f_{1d} - f_{2d}}\left[\frac{1}{d} - \frac{1}{d_0}\right] \quad (7)$$

Summing up, in the case where the focal lengths $f_{1d}$ and $f_{2d}$ are both free from distortion, that is to say they do not depend upon the angles of incidence $\alpha_{1d}$ and $\alpha_{2d}$ of the light rays coming from the target and consequently upon the distance of the target:

(I)—If the coincidence takes place at the center of the field for a target $M_0$ at a distance $d_0$ in a given direction, for example perpendicular to the range-finder basis, it is necessary, to restore the coincidence for another target M at a distance $d$ in the same direction, to rotate the range-finder through an angle $i$ which is related to the distance $d$ by Formula 5 that is to say is a hyperbolic function of the distance $d$.

(II)—The light rays from said target at the distance $d$ fall on the objective $L_1$ at the incidence angle $\alpha_1$ and on the objective $L_2$ at the incidence angle $\alpha_2$ both of these angles depending hyperbolically on $d$.

(III)—The scale of the range-finder, which represents the values of $h_d$ in terms of $d$, is a hyperbolic scale.

(IV)—The incidence angles $\alpha_{1d}$ and $\alpha_{2d}$ differ from one another by the quantity $$b\left(\frac{1}{d} - \frac{1}{d_0}\right)$$

which may be considered as the difference of parallax of the basis $b$ of the range-finder as seen from target $M_0$ and target M.

In order to allow the "superelevation-distance coupling" condition to be satisfied, it is necessary that:

$$\widehat{M_0AX} = \beta_{d_0}$$

$$\widehat{MAX} = \beta_d$$

$$i = \widehat{M_0AM} = \beta_{d_0} - \beta_d$$

$\beta_{d_0}$ and $\beta_d$ are respectively the superelevation angles for firing at targets situated at distances $d_0$ and $d$.

Formulae 4 and 5 then become:

$$\frac{f_{1d}}{f_{2d}} = \frac{\beta_{d_0} - \beta_d - (\delta-b)\left(\frac{1}{d} - \frac{1}{d_0}\right)}{\beta_{d_0} - \beta_d - \delta\left(\frac{1}{d} - \frac{1}{d_0}\right)} \quad (4')$$

$$\beta_{d_0} - \beta_d = \frac{[\delta f_{1d} - (\delta-b)f_{2d}]\left(\frac{1}{d} - \frac{1}{d_0}\right)}{f_{1d} - f_{2d}} \quad (5')$$

If $f_{1d}$ and $f_{2d}$ are both free from distortion, $\beta_d$ is an hyperbolic function of the distance. This function is represented, for a specific model of range-finder, by the curve III of Fig. 6.

The superrelevation $\beta_d$ to be given to the firearm for firing at a target situated at the distance $d$ may be developed in series of the distance by the formula:

$$\beta_d = k_1 d + k_2 d^2 + k_3 d^3 + \ldots \quad (8)$$

The result of this Formula 8, in which $k_1$, $k_2$, $k_3$, ... are constant coefficients, is that the superelevation $\beta_d$ is a parabolic function of the order $n$ of the distance and, in practice, by neglecting the terms of the third order and farther, a second-degree function of the distance. This function is represented, for a specific firearm using projectiles of a specific charge, by the curve I of Fig. 6.

The condition of "superelevation-distance coupling" is obtained by replacing $\beta_{d_0}$ and $\beta_d$ by their values derived from (8) in Equation 4'; this gives:

$$\frac{f_{1d}}{f_{2d}} = \frac{k_1(d_0-d)+k_2(d_0^2-d^2)-(\delta-b)\left(\frac{1}{d}-\frac{1}{d_0}\right)}{k_1(d_0-d)+k_2(d_0^2-d^2)-\delta\left(\frac{1}{d}-\frac{1}{d_0}\right)} \quad (9)$$

It is seen that the ratio of the focal lengths is a rational fraction of the distance. As already said, the term $(\delta-b)$ can be neglected, Equation 9 may be written:

$$\frac{f_{1d}}{f_{2d}} = \frac{k_1(d_0-d)+k_2(d_0^2-d^2)}{k_1(d_0-d)+k_2(d_0^2-d^2)-b\left(\frac{1}{d}-\frac{1}{d_0}\right)} \quad (9')$$

The numerator of Equation 9 is equal to $\alpha_{2d}$ and the denominator to $\alpha_{1d}$; $\alpha_{1d}$ and $\alpha_{2d}$ differ from each other by the difference of parallax $$b\left(\frac{1}{d}-\frac{1}{d_0}\right)$$

Formulae 9 and 9' give the distortion of one or both focal lengths $f_{1d}$ and $f_{2d}$ as a function of the distance $d$. It is possible at one's will to take $f_{2d}$ free from distortion i.e. constant and $f_{1d}$ distorted according to the ratio $\alpha_{2d}/\alpha_{1d}$ or to take $f_{1d}$ distorted according to the law $k\alpha_{2d}$ and $f_{2d}$ distorted according to the law $k\alpha_{1d}$, where $k$ is a constant.

By way of example, it is assumed that a range-finder is to be constructed in accordance with the invention for a firearm, the projectile of which has a superelevation curve given by Formula 8, in which:

$$k_1 = 1.897 \; 10^{-4}$$
$$k_2 = 1.434 \; 10^{-7}$$

the superelevation $\beta_d$ being expressed in radians and the distance $d$ in meters.

If the dispersion of this projectile is of the order of a thousandth of a radian for distances between zero and 300 meters, the range-finder should be sufficiently accurate for the telemetered superelevation to be identical with the theoretical superelevation to within approximately a thousandth of a radian for distances less than 300 meters.

Let us give the table of the following data:

$$f_{2d} = 0.10 \text{ m.}$$
$$b = 0.30 \text{ m.}$$
$$\delta = 0.35 \text{ m.}$$
$$d_0 = 300 \text{ m.}$$

Formulae 9 and 9' become respectively:

$$f_{1d} = 0.1 \frac{1.897 \; 10^{-4}(300-d)+1.434 \; 10^{-7}(90{,}000-d^2)-0.05\left(\frac{1}{d}-\frac{1}{300}\right)}{1.897 \; 10^{-4}(300-d)+1.434 \; 10^{-7}(90{,}000-d^2)-0.35\left(\frac{1}{d}-\frac{1}{300}\right)} \quad (10)$$

$$f_{1d} = 0.1 \frac{1.897 \; 10^{-4}(300-d)+1.434 \; 10^{-7}(90{,}000-d^2)}{1.897 \; 10^{-4}(300-d)+1.434 \; 10^{-7}(90{,}000-d^2)-0.30\left(\frac{1}{d}-\frac{1}{300}\right)} \quad (10')$$

and they express the value of the distorted focal length $f_{1d}$ as a function of the distance $d$. For example using Equation 10, for the distance $d=83$ meters, the denominator of the said equation is equal to:

$$\alpha_{1;83} = 41.16 + 11.93 - 3.04 = 50.05 \text{ mils}$$

and the numerator is equal to:

$$\alpha_{2;83} = 41.16 + 11.93 - 0.45 = 52.64 \text{ mils}$$

and $f_{1;83}$ is equal to:

$$f_{1;83} = 0.1 \times \frac{52.65}{50.04} = 105.16 \text{ mms.}$$

If Equation 10' were used instead of Equation 10, the results would have been the following:

$$\alpha_{1;83} = 41.16 + 11.93 = 53.09 \text{ mils}$$

$$\alpha_{2;83} = 41.16 + 11.93 - 2.61 = 50.48 \text{ mils}$$

$$f_{1;83} = 0.1 \times \frac{53.09}{50.48} = 105.17 \text{ mms.}$$

the result obtained is, for all practical purposes, quite identical.

As only the ratio $f_{1d}/f_{2d}$ is given by Equations 9 or 9', instead of taking $f_{1d}$ variable with $d$ and $f_{2d}$ constant, both focal lengths $f_{1d}$ and $f_{2d}$ may be made variable with $d$ as already said.

Observing that the numerator and the denominator of Equations 9 and 9' are divisible by $(d_0-d)$, these equations may be written respectively:

$$\frac{f_{1d}}{f_{2d}} = \frac{k_1+k_2(d_0+d)-(\delta-b)/dd_0}{k_1+k_2(d_0+d)-\delta/dd_0} \quad (11)$$

$$\frac{f_{1d}}{f_{2d}} = \frac{k_1+k_2(d_0+d)}{k_1+k_2(d_0+d)-b/dd_0} \quad (11')$$

and it may be taken for the expressions of $f_{1d}$ and $f_{2d}$ the following:

$$f_{1d} = k[k_1+k_2(d_0+d)-(\delta-b)/dd_0]$$

or $$f_{1d} = k[k_1+k_2(d_0+d)]$$

and respectively:

$$f_{2d} = k[k_1+k_2(d_0+d)-\delta/dd_0]$$

or $$f_{2d} = k[k_1+k_2(d_0+d)-b/dd_0]$$

in which $k$ is a constant coefficient.
If for example:

$$k = 2.718 \; 10^{-3}$$

it is obtained:

$$f_{1;300} = 101.25 \text{ mms.}$$
$$f_{1;83} = 89.25 \text{ mms.}$$
$$f_{2;300} = 100 \text{ mms.}$$
$$f_{2;83} = 84.84 \text{ mms.}$$

The numerical examples which precede show the method of designing the range-finder. The distance $d_0$ and the theoretical superelevation $\beta_{d_0}$ relative to this distance being given, to a distance $d$ and to the theoretical superelevation $\beta_d$ relative to this distance correspond, by Formulae 9 or 9', light ray incident angles $\alpha_{1d}$ and $\alpha_{2d}$ functions of $d$ and one or two focal lengths $f_{1d}$ and $f_{2d}$ functions of $d$ according to certain laws. Means to provide optical systems having focal lengths complying with said laws will be given hereinafter. Even now, it is to be noted that the laws of distortion in terms of $d$ cannot be strictly achieved; it results that the superelevation indicated by the range-finder would differ from the theoretical superelevation by unavoidable error differences which must be maintained smaller than the superelevation increment corresponding to the dispersion of the projectile.

The following table gives in the case where $f_{2d}$ is constant the values of $\alpha_{1d}$, $\alpha_{2d}$, theoretical $\beta_d$ all in mils, theoretical $f_{1d}$ in mms. and $h_d$ in mms. corresponding to predetermined values of $d$ in meters

| $d$ in meters | $\alpha_{1d}$ in mils | $\alpha_{2d}$ in mils | theoretical $\beta_d$ in mils | $h_d$ in mms. | theoretical $f_{1d}$ in mms. |
|---|---|---|---|---|---|
| 344.7 | −9.90 | −10.03 | 82.43 | −1 | 101.31 |
| 320.4 | −5.03 | −5.09 | 75.50 | −0.5 | 101.265 |
| 300 | 0 | 0 | 69.80 | 0 | 101.25 |
| 282.2 | 4.99 | 5.05 | 65.00 | 0.5 | 101.265 |
| 265.6 | 9.89 | 10.02 | 60.50 | 1 | 101.31 |
| 249 | 14.73 | 14.94 | 56.10 | 1.5 | 101.42 |
| 231.7 | 19.65 | 19.95 | 51.65 | 2 | 101.52 |
| 218 | 23.51 | 23.88 | 48.20 | 2.38 | 101.57 |
| 126.6 | 43.62 | 44.99 | 26.30 | 4.5 | 103.14 |
| 83.0 | 50.67 | 52.64 | 16.70 | 5.26 | 105.15 |
| 76.8 | 51.53 | 54.44 | 15.50 | 5.44 | 105.64 |
| 71.2 | 52.34 | 55.55 | 14.00 | 5.55 | 106.14 |

Several methods may be used for obtaining the distortion required.

A first method consists in placing, in the image field given by a non-distorting objective, an optical system comprising two lenses bonded together along a spherical face having a small curvature radius. The image given by the objective preceding the optical system is formed near one of the aplanetic points of the diopter constituted by said face and the image which the system gives is formed near the second aplanetic point. In these conditions, the aberrations called spherical aberration, coma aberration and astigmatism aberration are not substantially altered and emphasized.

Figure 2:
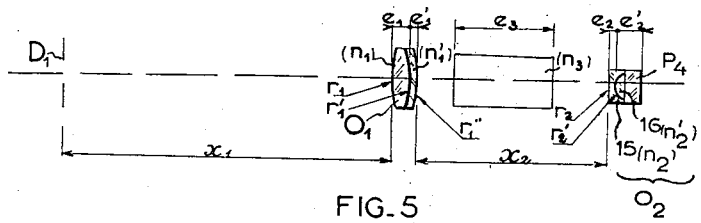
Fig. 2 represents the objective of the range-finder according to the invention which is affected with distortion.

Fig. 2 represents diagrammatically the whole of the optical system affected by distortion, the value of the principal focal length of which (focal length for rays at normal incidence) is $$f_1 \text{ (here } f_{1;300}) = 101.25 \text{ mms.}$$

The entrance-pupil diaphragm $D_1$ is located at a distance $x_1$ in front of the objective $O_1$ which is non-distorting and is formed by a system of two lenses that have been stuck together and that have respectively radii $r_1$, $r_1'$, $r_1''$ ($r_1'$ being the common radius of the faces that have been stuck together) and thicknesses $e_1$ and $e_1'$. $e_3$ represents the equivalent in air of the thickness of glass constituted by the prisms (not shown) which are seen in Figs. 3 and 4. $O_2$ is a doublet which constitutes the distorting part of the objective $L_1$ and is formed by two lenses 15 and 16 cemented together along a common face having a small radius $r_2'$. The first face of lens 15 has a radius $r_2$ and the back face of the lens 16 which is a plane face is cemented to a prism $P_4$ which will be referred to hereinafter. The respective thicknesses of the two lenses are $e_2$ and $e_2'$. Finally, $x_2$ denotes the distance between the objective $O_1$ and the doublet $O_2$.

The rays coming from the periphery portion of the objective $O_1$ and which are brought to be substantially parallel by the front face of lens 15 fall upon the common spherical face of lenses 15 and 16 with a great obliquity with respect to the radial direction. There results a distortion which depends upon the radius $r_2'$ and the refraction indexes of the two lenses. By suitably selecting these parameters, the distortion may be varied to fulfill predetermined conditions.

The table below gives the dimensional and optical characteristics of the optical system $(O_1+O_2)$ affected by distortion.

| Optical element | Radii in mms. | Thicknesses and distances in mms. | Index of the glass | $\nu$-value of the glass |
|---|---|---|---|---|
| $O_1$ | $r_1 = 56.55$ $r_1' = -32.73$ $r_1'' = -96.52$ | $x_1 = 132$ $e_1 = 7.75$ $e_1' = 1.90$ $e_3 = 39.52$ $x_2 = 76.31$ | $n_1 = 1.500$ $n_1' = 1.620$ $n_3 = 1.518$ | 61 36 |
| $O_2$ | $r_2 = -105$ $r_2' = 5.577$ | $e_2 = 2$ $e_2' = 9.43$ | $n_2 = 1.620$ $n_2' = 1.518$ | 64 |

Figs. 3 and 4 show the general arrangement of the range-finder. The two windows $F_1$ and $F_2$ are separated from each other by a distance which is equal to the base, say 0.30 m.

The upper beam 1, which relates to the optical system affected by distortion, passes successively through:

The entrance window $F_1$;
The pentagonal prism $P_1$;
The entrance-pupil diaphragm $D_1$ of a diameter equal to 7.5 mms.;
The objective $O_1$;
The Amici prism $P_2$, the function of which is to revert the image;
The rhombohedral prism $P_3$, the function of which is to displace the beam 1 laterally after deviation by the prism $P_2$ to bring it into coincidence with the beam 2, after the latter has passed through the splitting prism P, as will be seen hereinafter;
The distortion-producing doublet $O_2$;
The field-splitting prisms $P_4$ and P;
The eyepiece $Oc$.

The objectives $O_1$ and $O_2$ together constitute the objective $L_1$ of Fig. 1 and it is this combination of objectives which has a focal length of $f_{1d}$ which is a function of the distance.

The lower beam 2, which corresponds to the undistorted objective, passes successively through:

The entrance window $F_{21}$;
The objective $O_{21}$;
The inverting and reverting Porro prism system, constituted by the prisms $P_{21}$ and P;
The eyepiece $Oc$.

Figure 5:
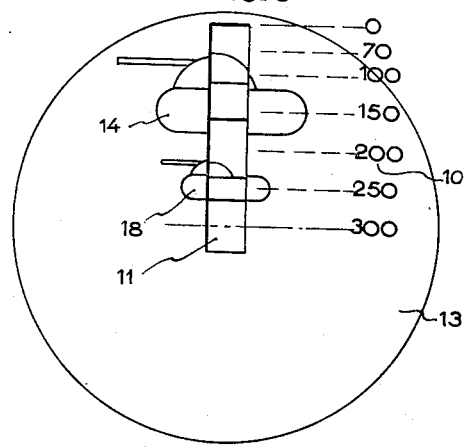
Fig. 5 represents the appearance of the field of the range-finder, as seen through the eyepiece.

The prisms $P_4$ and P are stuck together and a part of their common surface 5 is made reflecting, the other part 6 being nonreflecting, so that the field has the appearance shown in Fig. 5. A distance scale 10 may be engraved on one of the edges of the rectangle 11.

The undistorted objective $O_{21}$ has, as has been stated, a focal length of 100 mms. and its distortion is negligible for the whole range of the range-finder.

The eyepiece $Oc$, which has a focal length of 28.6 mms., constitutes with $O_{21}$ an afocal lens with a magnifying power of 3.5 and a total field of 150 mils; the standard and well-known characteristics of this system need not be described.

Fig. 8 represents doublet $O_2$ at an enlarged scale and shows the paths of three light rays 101—103 passing through the center of objective $O_1$ located at $x_2=76.31$ mms. at the left from the front face of lens 15, with incidence angles of respectively:

$$\alpha_{1;218}=23.51 \text{ mils}=1°35'$$
$$\alpha_{1;126.6}=43.62 \text{ mils}=2°50'$$
$$\alpha_{1;71.2}=52.34 \text{ mils}=3°$$

These incidence angles correspond respectively to distances of 218 ms., 126.6 ms., 71.2 ms. The front face of lens 15 brings the rays to become substantially parallel to the common optical axis of objective $O_1$ and doublet $O_2$, the distance of the rays to said axis being written in the drawing in millimeters. The paths of the rays within lens 16 have been drawn by applying the formula $$\sin i = \frac{1.518}{1.620} \sin r$$

$i$ being the angle of incidence of the rays onto the front face of lens 16 and $r$ the corresponding angle of refraction. For rays 101 to 103, the angles of incidence are respectively 21°50′, 45°, 55°20′ and the angles of refraction 23°23′, 49°, 61°22′. In the focal plane of the combination $O_1+O_2$, the distances of the spots of rays 101—103 to the optical axis are respectively:

$$h_{1;218}=2.394 \text{ mms.}$$
$$h_{1;126.6}=4.500 \text{ mms.}$$
$$h_{1;71.2}=5.560 \text{ mms.}$$

These values are written in Fig. 8.

Fig. 8 shows also, in the focal plane of objective $O_{2i}$ which is common to the focal plane of the combination $O_1+O_2$, the distances to the optical axis of the spots of three light rays 201—203 passing through the center of said objective with the same incidence angle than rays 101—103 respectively. These distances are 2.35, 4.37, 5.24 mms.; they are respectively different from 2.394, 4.500, 5.560 mms. Then the light rays from the target do not fall onto objective $O_{2i}$ the focal length of which is 100 mms. with incidence angles $\alpha_{1;218}$, $\alpha_{1;126.6}$, $\alpha_{1;71.2}$ but with incidence angles:

$$\alpha_{2;218} = 23.88 \text{ mils}$$
$$\alpha_{2;126.6} = 44.99 \text{ mils}$$
$$\alpha_{2;71.2} = 55.55 \text{ mils}$$

and the products $f_{2d}\alpha_{2d}$ give respectively:

$$h_{2;218} = 2.388 \text{ mms.}$$
$$h_{2;126.6} = 4.499 \text{ mms.}$$
$$h_{2;71.2} = 5.555 \text{ mms.}$$

which are respectively equal to $h_{1;218}$, $h_{1;126.6}$, $h_{1;71.2}$ to within a hundredth of a millimeter.

Figure 6:
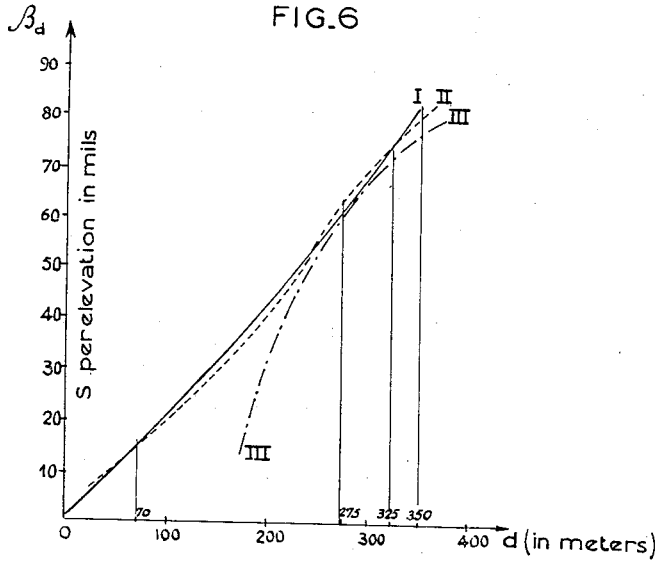
Fig. 6 shows curves which explain the operation of the range-finder.

In Fig. 6, three curves of superelevation $\beta_d$ have been represented as functions of the distance $d$:

curve I is the curve giving the theoretical superelevation;
curve III corresponds to the superelevation which would be obtained from a range-finder of the prior art without "superelevation-distance coupling";
curve II is the curve giving $\beta_d$ telemetered with the instrument of the invention. The following table gives the theoretical superelevation and the telemetered superelevation:

| practical $\beta_d$ in mils | theoretical $\beta_d$ in mils |
| --- | --- |
| 81 | 82.43 |
| 76 | 75.50 |
| 71 | 69.80 |
| 66 | 65.00 |
| 61 | 60.50 |
| 56 | 56.10 |
| 51 | 51.65 |
| 47.1 | 48.20 |
| 26 | 26.30 |
| 17.7 | 16.70 |
| 16.5 | 15.50 |
| 15.4 | 14.00 |

Comparison of the curves II and III is sufficient to make the advantage of the invention understood. When there is no distortion, the "superelevation-distance coupling" is acceptable only for the range 275–325 ms., whereas the range-finder according to the invention is utilisable for the firearm in question for the range between 70 and 350 ms. Of course, the undistorted objective may be made to correspond to the upper beam 1; in that case, the distortion will be made in the opposite direction and, in order to obtain it, it is sufficient to reverse the indices of the lenses 15 and 16 of the doublet $O_2$ and to give it a suitable power and a suitable curvature.

In practice, the doublet $O_2$ may produce a relative distortion (with acceptable residual aberrations) of between 5 and 10%; this renders it possible to solve, according to the invention, all the practical problems of "superelevation-distance coupling" which may arise.

In a second method for obtaining the distortion required, the objective $L_1$, which was formerly constituted by a spherical optical system composed of an undistorting objective $O_1$ and a coaxial distorting doublet $O_2$, comprises now an objective $\Omega_1$ and a system of prisms $T_1$ and $T_2$ with horizontal edges. The optical system ($\Omega_1$, $T_1$, $T_2$) forms an objective of the cylindrical type. It has two focal lengths, one $\varphi_{1h}$ corresponding to light rays in a horizontal plane and the other $\varphi_{1v}$ corresponding to light rays in a vertical plane. It is this focal length $\varphi_{1v}$ that plays the part of $f_{1d}$ in the system of Figs. 3 and 4. It is equal to the product of the focal length $\varphi_{1h}$ by the magnification of the prism system which is itself a function of the distance $d$.

The prism $T_1$ has a vertex angle of 38°.700 and its front face is perpendicular to the ray 1 issuing from the pentagonal prism $P_1$. The prism $T_2$ has a vertex angle of 46°.798 and its input face forms an angle of 8°.410 with the output face of prism $T_1$. Both prisms have a refractive index of 1.516.

Figure 9:
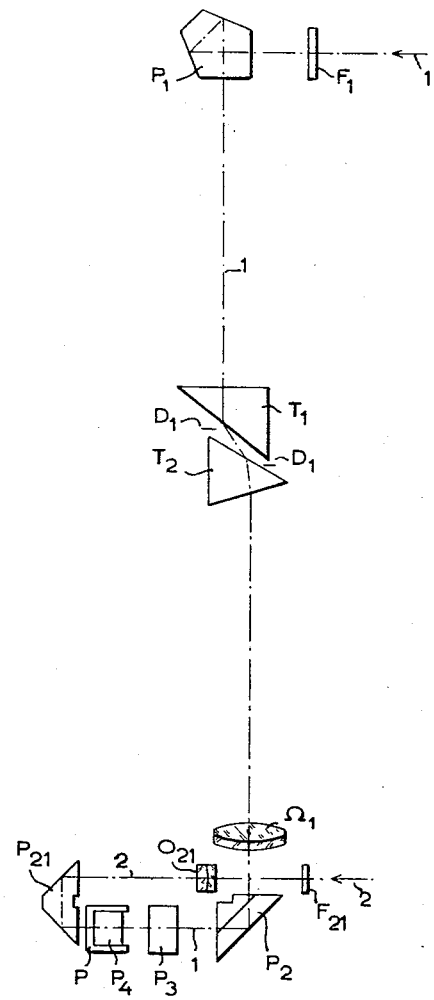
Figs. 9 and 10 are optical diagrams showing, in vertical and horizontal projection respectively, a second type of range-finder according to the invention.
Figure 10:
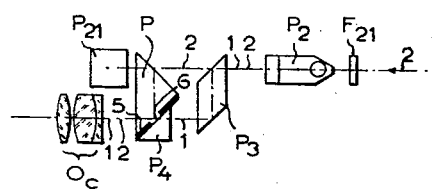

Figs. 9 and 10 respectively derive from Figs. 3 and 4 by omitting doublet $O_2$, replacing the undistorting objective $O_1$ by another undistorting objective $\Omega_1$ of different focal length $\varphi_{1h}$ and removing prism $P_1$ from its former location by a distance which depends upon the spacing between the two prisms and which, in a range-finder constructed by the applicants, has a value of 29 mms.

The light rays from the target fall onto prism $T_1$ with incidence angles $\alpha_{1d}$ and leave prism $T_2$ with output angles $a_{1d}$ (angles $a_{1d}$ being taken not from the normal to the output face of $T_2$ but from the direction of the ray 1). The quantity $h_{1d}$ is here equal to:

$$h_{1d} = a_{1d}\varphi_{1h} = \alpha_{1d}\frac{a_{1d}}{\alpha_{1d}}\cdot\varphi_{1h} = \alpha_{1d}G(d)\varphi_{1h}$$

where $G(d)$ is the magnification of the prism system which is a function of $d$.

The following table gives, in terms of predetermined values of the distance $d$, $\alpha_{2d}$ in degrees and mils, the product $\alpha_{2d}f_{2d}$ ($f_{2d}$ is independent of $d$ and equal to 100 mms.), $\alpha_{1d}$ in degrees and mils, $a_{1d}$ in degrees and mils, and the product $a_{1d}\varphi_{1h}$ ($\varphi_{1h}$ is independent of $d$ and equal to 77.88 mms.).

| $d$ in meters | $\alpha_{2d}$ in deg. | $\alpha_{2d}$ in mils | $\alpha_{2d}f_{2d}$ in mms. | $\alpha_{1d}$ in deg. | $\alpha_{1d}$ in mils | $a_{1d}$ in deg. | $a_{1d}$ in mils | $a_{1d}\varphi_{1h}$ in mms. |
| --- | --- | --- | --- | --- | --- | --- | --- | --- |
| 344.7 | −0.722 | −12.60 | −1.260 | −0.715 | −12.48 | −0.925 | −16.14 | −1.257 |
| 320.4 | −0.326 | −5.69 | −0.569 | −0.323 | −5.64 | −0.418 | −7.30 | −0.569 |
| 300 | 0 | 0 | 0 | 0 | 0 | 0 | 0 | 0 |
| 282.2 | 0.275 | 4.80 | 0.480 | 0.271 | 4.73 | 0.353 | 6.16 | 0.480 |
| 265.6 | 0.533 | 9.30 | 0.930 | 0.525 | 9.16 | 0.686 | 11.97 | 0.932 |
| 249 | 0.785 | 13.70 | 1.370 | 0.773 | 13.49 | 1.012 | 17.66 | 1.375 |
| 231.7 | 1.040 | 18.15 | 1.815 | 1.023 | 17.85 | 1.342 | 23.42 | 1.824 |
| 218 | 1.238 | 21.61 | 2.161 | 1.216 | 21.22 | 1.597 | 27.87 | 2.171 |
| 126.6 | 2.493 | 43.51 | 4.351 | 2.414 | 42.13 | 3.219 | 56.18 | 4.375 |
| 83 | 3.043 | 53.11 | 5.311 | 2.893 | 50.49 | 3.884 | 67.79 | 5.279 |
| 76.8 | 3.111 | 4.30 | 5.430 | 2.944 | 51.38 | 3.956 | 69.05 | 5.378 |
| 71.2 | 3.197 | 55.80 | 5.580 | 3.013 | 52.59 | 4.051 | 70.70 | 5.506 |

In the table, the digits at the right of the integer part in degrees are decimal parts of a degree.

A good coincidence is observed between the values of the fourth and last columns. When coincidence is not strict, superelevation as telemetered differs from the theoretical superelevation by small amounts which may be calculated by means of formula 5'. Calculation is not reproduced here.

In Fig. 11, there is shown the two prisms $T_1$ and $T_2$ and the paths of two rays, the first 301 coming from a target at a distance of 300 meters and the second 302 from a target at a distance of 71.2 meters. The values of the deviation angles undergone by said last ray are written in Fig. 11.

Fig. 7 shows the aiming instrument 7 mounted on the barrel 8 of a rocket launcher. 9 denotes the eyepiece and 1 and 2 denote the beams of light which are incident on the distorting objective and on the undistorting objective respectively.

It has been seen that, by means of prisms 3 and 4, for the distance $d_0$ of the target, the images of the target were brought to coincide at the center of the field and that the superelevation $\beta_{d_0}$ was then that of the target at the distance $d_0$. For dispensing with these prisms, the instrument 7 is not mounted exactly perpendicularly but it makes an angle $\beta_{d_0}$ with the normal to the barrel axis owing to the wedge-shaped member 12. This member 12 can give a regulatable inclination between the range-finder and the barrel of the firearm. Theoretically, this member renders it possible for one only of the two prisms 3 and 4 to be dispensed with. Let us designate by $\theta$ the angle between the basis of the instrument and the normal to the axis of the barrel located in the vertical plane passing through the axis of said barrel. We have between the angles $\beta_1$, $\theta$, $\epsilon_1$, $\epsilon_2$ the following relationships:

$$\epsilon_1 = \beta_{d_0} - \theta + \frac{\delta}{d_0} \tag{12}$$

$$\epsilon_2 = \beta_{d_0} - \theta + \frac{\delta - b}{d_0} \tag{12'}$$

If we take $\theta = \beta_{d_0}$ as previously assumed, there is found for $\epsilon_1$ and $\epsilon_2$ the values pointed out at the beginning of the present specification. But it is seen that it is possible to secure strictly perpendicularly the range-finder to the barrel of the firearm, in which case $\epsilon_1$ and $\epsilon_2$ are given by Equations 12 and 12' in which $\theta$ is made equal to zero.

The field of the instrument is represented in Fig. 5.

The rays coming from the distorting objective pass through the non-reflecting part 6 and arrive into the window 11 of the field. The rays coming from the undistorting objective are reflected by the reflecting part 5 and arrive into the part 13 of the field. The tank 18 seen in the fields is situated at quite 250 meters away, since its partial images in 11 and in 13 coincide (or, more precisely, have a particular part, the band of Caterpillar for example, which forms a continuous complete image) and the superelevation has been completely regulated. It is to be noted that, in the case of coincidence, the coincidence is not complete for all the target due to the different magnifications of the objectives but is achieved at a single level of the target perpendicular to the extension of the range-finder basis. On the other hand, the tank 14 is not 150 meters away and the superelevation has been incompletely regulated since the two partial images do not coincide. The user shown in Fig. 7 should rotate his firearm until this coincidence takes place.

What we claim is:

1. The combination with a flat trajectory firearm having a barrel adapted to be tilted vertically, about an horizontal axis into different angular positions for firing at a distant target and to fire projectiles with a superelevation $\beta_d$ related to the distance $d$ of the target by the relationship:

$$\beta_d = k_1 d + k_2 d^2$$

where $k_1$ and $k_2$ are constant coefficients, of a separate-field coincidence range-finder comprising an elongated tubular casing fixedly secured to said barrel in a vertical plane passing through the axis of said barrel and substantially perpendicularly to said axis, first and second objectives of unequal focal lengths, having optical axes parallel with each other and perpendicular to said elongated casing, the distance of the optical axis of the first objective to the axis of the barrel being equal to $\delta$ and the distance of the optical axis of the second objective to the axis of the barrel being equal to $\delta - b$, two prisms respectively located before the first and second objectives and positioned to direct the light rays incident from a target at a distance $d_0$ from the firearm through the first and second objectives to form two images of said target on the optical axes of said objectives, a viewer, splitting prism means having reflective and non reflective parts to juxtapose the fields of the objectives on one side and the other side of a reference line on said viewer, whereby the angles at which the light rays incident from a target at a distance $d$ fall respectively upon the first and second objectives when the range-finder and the firearm are tilted to bring into coincidence the two images of said target at a distance $d$ are functions of said distance $d$, the second objective being a non distorting objective, having a constant focal length $f_{2d}$ with respect to the distance $d$ and the first objective being a distorting objective having a focal length $f_{1d}$ which is related to the distance $d$ of the target by the relationship:

$$\frac{f_{1d}}{f_{2d}} = \frac{k_1(d_0-d) + k_2(d_0^2-d^2) - (\delta-b)\left(\frac{1}{d}-\frac{1}{d_0}\right)}{k_1(d_0-d) + k_2(d_0^2-d^2) - \delta\left(\frac{1}{d}-\frac{1}{d_0}\right)}$$

the angles at which the light rays from the target fall on the first and second objectives being respectively equal to the denominator and numerator of the second member of said relationship whereby the angle to which it is necessary to tilt the range-finder and the firearm to bring into coincidence the two images of the target at a distance $d$ through the two objectives is equal to the superelevation $\beta_d$ of the firearm for said distance.

2. The combination with a flat trajectory firearm having a barrel adapted to be tilted vertically about an horizontal axis into different angular positions for firing at a distance target and to fire projectiles with a superelevation $\beta_d$ related to the distance $d$ of the target by the relationship:

$$\beta_d = k_1 d + k_2 d^2$$

where $k_1$ and $k_2$ are constant coefficients, of a separate-field coincidence range-finder comprising an elongated tubular casing fixedly secured to said barrel in a vertical plane passing through the axis of said barrel and substantially perpendicularly to said axis, first and second objectives of unequal focal lengths, having optical axes parallel with each other and perpendicular to said elongated casing, the distance of the first objective to the axis of the barrel being equal to $\delta$ and the distance of the optical axis of the second objective to the axis of the barrel being equal to $(\delta - b)$, two prisms respectively located before the first and second objectives and positioned to direct light rays incident from target at a distance $d_0$ from the firearm through the first and second objectives to form two images of said target on the optical axes of said objectives, a viewer, splitting prisms means having reflective and non-reflective parts to juxtapose the fields of the objectives on one side and the other of a reference line in said viewer, whereby the angles at which the light rays incident from a target at a distance $d$ fall respectively upon the first and second objectives when the range-finder and the firearm are tilted to bring into coincidence the two images of said target at a distance $d$ are functions of said distances $d$, the two objectives being distorting objectives having respectively focal lengths $f_{1d}$ and $f_{2d}$ which are related to the distance $d$ of the target by the relationships.

$$f_{1d} = k[k_1 + k_2(d_0+d) - (\delta-b)/dd_0]$$

$$f_{2d} = k[k_1 + k_2(d_0+d) - \delta/dd_0]$$

$k$ being a constant coefficient, the angles at which the light rays from the target fall on the first and second objectives being respectively equal to the expressions of $f_{2d}$ and $f_{1d}$ multiplied by the quantity $(d_0-d)$, whereby the angle through which it is necessary to tilt the range-finder and the firearm to bring into coincidence the two images of the target at a distance $d$ through the two objectives is equal to the superelevation of the firearm for said distance.

3. The combination of a separate field coincidence range-finder with a flat trajectory having a barrel aimed at a distant target by tilting in a vertical direction about a horizontal axis, the angular firing position of said firearm from said horizontal axis being related to the distance of the target by the relationship between the ballistic angle of superelevation $\beta_d$ for the firearm and said distance $d$ as expressed in the formula:

$$\beta_d = k_1 d + k_2 d^2$$

wherein $k_1$ and $k_2$ are constants, said range-finder comprising a tubular casing fixedly secured in vertical relation to said barrel, a first distorting objective comprising a non-distorting lens and a distorting lens, said first objective having focal length $f_{1d}$, said distorting lens being located along the optical path of said non-distorting lens, a second non-distorting objective having focal length $f_{2d}$ coupled with said first objective and in superimposed optical relationship thereto, said first and second objectives being mounted in said casing to move as a unit therewith requiring sighting of said firearm at an angle which is a function of $d$, the distance of the gun from said target which permits light rays from said target to fall upon said first and second objectives respectively at angles which are each a function of said distance $d$, the focal lengths of said first and second objectives being unequal, each of said first and second objectives having its optical axis parallel to each other and each of said optical axes being substantially parallel to the barrel of said firearm, said distorting lens having a curved refracting surface which divergently refracts incident rays from said non-distorting lens of said first distorting objective whereby the variation of tilt and distance from the target in said coincidence range-finder simulates the theoretical parabolic ballistic superelevation curve for said firearm, the distance from the optical axis of said first distorting objective to the axis of said barrel being $\delta$, the distance from the optical axis of said second non-distorting objective being $\delta - b$ where $b$ is the distance between the optical axes of said respective objectives, the relation of said unequal focal lengths $f_{1d}$ and $f_{2d}$ of said first and second objectives to the distance $d$ of the target from the firearm being defined in the formula:

$$\frac{f_{1d}}{f_{2d}} = \frac{k_1(d_0-d) + k_2(d_0^2-d^2) - (\delta-b)\left[\dfrac{1}{d}-\dfrac{1}{d_0}\right]}{k_1(d_0-d) + k_2(d_0^2-d^2) - \delta\left[\dfrac{1}{d}-\dfrac{1}{d_0}\right]}$$

where $d_0$ is the distance between the target and the images in coincidence at a common center in the field of the range-finder, $k_1$ and $k_2$ are the constants from the superelevation formula above and $\delta$ and $b$ have the relation defined, and whereby the angle at which the light rays from the target fall on the first objective is equal to the denominator of the above formula and the angle through which said range-finder is rotated compensates for the difference in the sighting curve of the range-finder and the ballistic superelevation curve of the gun to fix at coincidence of the two images of the target at a distance $d$ through the two objectives at an angle which is equal to the superelevation $\beta_d$ of the firearm for said distance, a viewer and splitting prism means having reflective and non-reflective parts to juxtapose the fields of said objectives on one side and another side of a reference line on said viewer, coincidence of the two images of a given target being obtained by inclining the range-finder and firearm at an angle which is a function of the distance $d$ of the firearm from the target.

4. A combination with a flat trajectory firearm of a range-finder of the separate field coincidence type according to claim 3 in which the tubular casing is elongated and is fixedly secured to said barrel in a vertical plane passing through the axis of said barrel, and said casing being disposed at an angle equal to the superelevation of the firearm for a target at a distance $d_0$ with the normal to the said axis for which the two images of the target through the first and second objectives are formed at a common center in the field of the range-finder on the optical axes of said objectives.

5. The combination of a separate field coincidence range-finder with a flat trajectory firearm having a barrel aimed at a distant target by tilting in a vertical direction about a horizontal axis, the angular firing position of said firearm from said horizontal axis being related to the distance of the target by a parabolic relationship between the ballistic angle of superelevation for the firearm and the distance of the target, said range-finder comprising a tubular casing fixedly secured in substantially perpendicular relation to the axis of said barrel and in the vertical plane passing therethrough, a first distorting objective comprising a non-distorting lens and a distorting lens and having a first focal length, a second non-distorting objective having a second focal length unequal to the first focal length, coupled with said first objective and in superimposed optical relationship thereto, said first and second objectives having their optical axes parallel to each other and substantially parallel to the axis of the barrel of said firearm and being mounted in said casing to move as a unit therewith requiring sighting of said firearm at an angle which is a function of the distance of the target which permits light rays to fall upon said first and second objectives at angles which are respectively equal to the difference of superelevation for a target at a reference distance and for a target to be aimed at on the one hand and to said difference of superelevation diminished by the difference of parallax of the distance between the two objectives as seen from the target at a reference distance and from the target to be aimed at on the other hand, splitting prism means having reflective and non-reflective parts to juxtapose the fields of said objectives on one side and another side of a reference line of a common focal plane, a scale of distances along said reference line in said common focal plane, simulating said parabolic relationship between the ballistic angle of superelevation for the firearm and the distance of the target, the distorting lens having a curved refracting surface which divergently refracts rays coming from said non-distorting lens of the first objective by angles substantially equal to said difference of parallax, whereby when coincidence of the two images of a given target is achieved by inclining the range-finder and firearm at a given angle, said angle is equal to the ballistic superelevation angle for said given target.

No references cited.